(No Model.)
E. A. JARVIS.
POWER TRANSMITTING DEVICE.
No. 436,017. Patented Sept. 9, 1890.
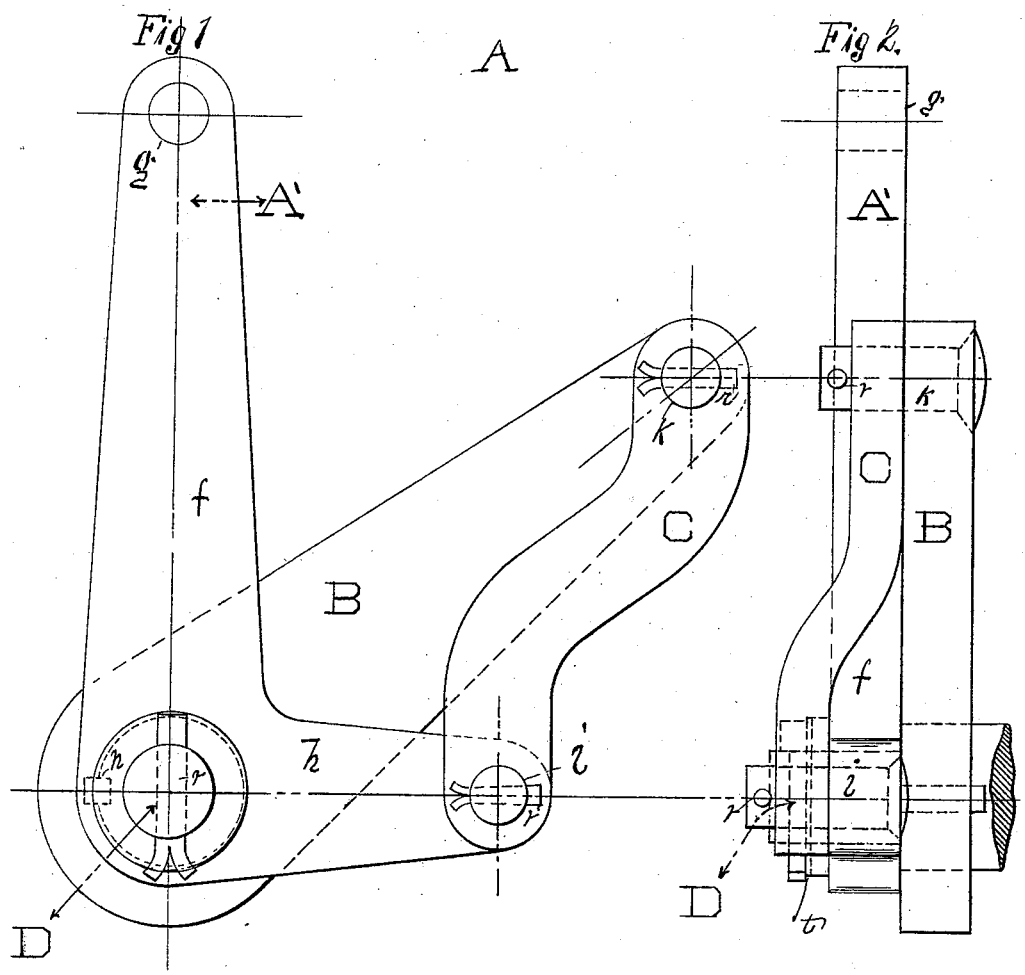
Witnesses.
Fred. S. Warner
H. Inglis
Inventor.
Edward A. Jarvis.
John Inglis atty

UNITED STATES PATENT OFFICE.

EDWARD A. JARVIS, OF PATERSON, NEW JERSEY.

POWER-TRANSMITTING DEVICE.

SPECIFICATION forming part of Letters Patent No. 436,017, dated September 9, 1890.

Application filed January 25, 1890. Serial No. 338,084. (No model.)

*To all whom it may concern:*

Be it known that I, EDWARD A. JARVIS, a citizen of the United States, residing at Paterson, Passaic county, State of New Jersey, have invented a new and useful Improvement in Power-Transmitting Devices, of which the following is a specification, reference being had to the accompanying drawings, forming a part thereof.

The object of my invention is to transmit power to power-supplying machines.

The invention consists in a rectangular lever and link so arranged as to transmit power to the power-supplying machine to which they are attached, as hereinafter more fully described and claimed.

Figure 1 of the drawings shows the device in elevation, in which figure the device is attached to the shaft of a steam-engine or other power-supplying machine, and Fig. 2 is an end view of the same.

A represents a power-transmitting device, the rectangular lever A' of which device I arrange and fasten loosely on the shaft D of the steam-engine or other power-supplying machine, as shown. The arm $f$ of the rectangular lever A', which is supposed to be twice the length of the arm or part $h$ of the same, has an orifice $g$ near the end of the same, which adapts the said arm or part $f$ of the lever A' to connect by means of a connecting-rod with the power-supplying machine to which the device is attached. The arm or part $h$ of the rectangular lever A', which is supposed to be only one-half the length of the part $f$ of the same, I connect with a link C by means of a stud $i$, and also connect the opposite end of the said link C to a crank-arm B by means of a stud K, the crank-arm being fixed to the shaft D by a key $n$, while the other connections are provided with a split key $r$, a washer $t$ being interposed in the usual way. The machine being in motion, power is communicated to the rectangular lever A' at the connection $g$, which puts said lever A' in motion, which by means of link C actuates arm B and turns the shaft D.

Having described my invention, I claim as new and desire to secure by Letters Patent—

The rectangular lever A', provided with orifice $g$, said lever having arms or parts $f$ $h$ of different lengths, arm B, shaft D, upon which said lever is loosely and said arm is rigidly mounted, and link C, connected to the extremities of arms B and $h$, substantially as described and shown.

EDWARD A. JARVIS.

Witnesses:
FRED I. WARNER,
JOHN INGLIS.